(12) United States Patent
Ma et al.

(10) Patent No.: US 7,857,986 B2
(45) Date of Patent: Dec. 28, 2010

(54) CHEMICAL MECHANICAL POLISHING SLURRY AND CHEMICAL MECHANICAL POLISHING APPARATUS AND METHOD

(75) Inventors: Suk Jung Ma, Icheon-si (KR); Ju Young Lee, Icheon-si (KR); Chang Gyu Kim, Seongnam-si (KR)

(73) Assignee: Hynix Semiconductor Inc., Icheon-si (KR)

( * ) Notice: Subject to any disclaimer, the term of this patent is extended or adjusted under 35 U.S.C. 154(b) by 769 days.

(21) Appl. No.: 11/759,905

(22) Filed: Jun. 7, 2007

(65) Prior Publication Data
US 2008/0160880 A1      Jul. 3, 2008

(30) Foreign Application Priority Data
Dec. 28, 2006      (KR) .................. 10-2006-0137150

(51) Int. Cl.
*C03C 15/00*   (2006.01)
*C03C 25/68*   (2006.01)

(52) U.S. Cl. ........................................ 216/89

(58) Field of Classification Search .................. 216/89; 438/692
See application file for complete search history.

(56) References Cited

U.S. PATENT DOCUMENTS

2002/0004317 A1* 1/2002 Cadien et al. ............... 438/788

FOREIGN PATENT DOCUMENTS

| JP | 2004-200268 | 7/2004 |
| KR | 10-2003-0059070 A | 7/2003 |
| KR | 1020050064592 A | 6/2005 |
| KR | 1020050090209 A | 9/2005 |
| KR | 10-2006-0019941 A | 3/2006 |
| KR | 1020060038773 A | 5/2006 |

* cited by examiner

*Primary Examiner*—Roberts Culbert
(74) *Attorney, Agent, or Firm*—Townsend and Townsend and Crew LLP

(57) ABSTRACT

A chemical mechanical polishing (CMP) slurry and a chemical mechanical polishing (CMP) apparatus and method reduce defects, such as scratches, while maintaining a high polishing rate of a target film to be polished through a CMP process. The CMP slurry includes a ceria-based abrasive having a concentration of 0.001-10 percent by weight and a silica-based abrasive having a concentration of 1-24 percent by weight.

6 Claims, 4 Drawing Sheets

CHEMICAL MECHANICAL POLISHING SLURRY AND CHEMICAL MECHANICAL POLISHING APPARATUS AND METHOD

CROSS-REFERENCES TO RELATED APPLICATIONS

The present application claims priority to Korean Patent Application No. 10-2006-137150, filed Dec. 28, 2006, which is incorporated by reference in its entirety.

BACKGROUND OF THE INVENTION

The present invention relates to a chemical mechanical polishing slurry and a chemical mechanical polishing apparatus and method, and more particularly to a chemical mechanical polishing slurry and a chemical mechanical polishing apparatus and method, in which defects, such as scratches, are reduced while maintaining a high polishing rate of a target film to be polished through a chemical mechanical polishing process.

A chemical mechanical polishing process (hereinafter, referred to as a "CMP" process) is performed by supplying a slurry to a polishing pad of a chemical mechanical polishing apparatus (hereinafter, referred to as a "CMP" apparatus) and rotating a target film on a semiconductor wafer on the polishing pad. The target film is polished by a chemical reaction between the target film and the slurry and mechanical friction between an abrasive (particles of the abrasive) in the slurry and the target film.

Generally, a slurry including either a silica($SiO_2$)-based abrasive or a ceria($CeO_2$)-based abrasive has been used in the CMP process.

A slurry including a silica-based abrasive has an aqueous solution state. For example, the slurry has an acidity of pH 9 or more. Particles of the abrasive are relatively large in size. The slurry has a relatively large weight and high viscosity due to a high molecular weight of silica. Thus, the particles of the silica-based abrasive cohere, and the slurry easily solidifies on the polishing pad.

The above solidified slurry is not easily removed, and generates defects, such as scratches on the target film, after the polishing pad has been used and the CMP process has been repeatedly performed, thereby highly influencing the reliability and the yield of the CMP process. For reference, FIGS. 1A and 1B are SEM photographs illustrating scratches on a target film, after the CMP process is performed.

When a ceria-based abrasive is used, the polishing rate of a target film to be polished, in an initial step in which there are stepped portions on the target film, is lowered due to a loading effect. The lowering of the polishing rate of the target film causes the stepped portions on the target film to be not properly removed, thereby reducing the productivity of the CMP process.

In order to solve the above drawbacks, a method for performing a CMP process has been proposed that includes a first polishing step using a slurry including a silica-based abrasive and a second polishing step using a slurry including a ceria-based abrasive. However, the slurry including the silica-based abrasive also solidifies on a polishing pad due to the cohesion of particles of the silica-based abrasive, and generates defects, such as scratches on the target film, thereby lowering the reliability and the yield of the CMP process.

BRIEF SUMMARY OF THE INVENTION

In accordance with one aspect of the invention, a chemical mechanical polishing (CMP) slurry comprises a ceria-based abrasive having a concentration of 0.001-10 percent by weight and a silica-based abrasive having a concentration of 1-24 percent by weight.

Preferably, the concentration of the ceria-based abrasive is 0.05-5 percent by weight and the concentration of the silica-based abrasive is 1-7 percent by weight.

The ceria-based abrasive and the silica-based abrasive may be separately supplied to a polishing pad of a CMP apparatus, and are mixed on the polishing pad.

The ceria-based abrasive may be supplied to a position closer to the center of the polishing pad than the silica-based abrasive, and may be mixed with the silica-based abrasive on the polishing pad. The ceria-based abrasive may be supplied to a position that is $85/390$-$105/390$ of the radius of the polishing pad distant from the center of the polishing pad. The silica-based abrasive may be supplied to a position that is approximately $10/390$ of the radius of the polishing pad more distant from the center of the polishing pad than the supply position of the ceria-based abrasive.

The CMP slurry may further comprise an anionic additive or a nonionic additive.

The CMP slurry may be used to polish one selected from the group consisting of: a polysilicon film, a silicon oxide film, a tungsten film, a copper film, and an aluminum film.

In accordance with another aspect of the invention, a chemical mechanical polishing (CMP) method comprises supplying a slurry comprising a ceria-based abrasive having a concentration of 0.001-10 percent by weight and a silica-based abrasive having a concentration of 1-24 percent by weight to a polishing pad of a CMP apparatus; and first polishing a target film on a semiconductor substrate on the polishing pad.

Preferably, the concentration of the ceria-based abrasive in the slurry is 0.05-5 percent by weight and the concentration of the silica-based abrasive in the slurry is 1-7 percent by weight.

The step of supplying the slurry may comprise supplying the ceria-based abrasive to the polishing pad; supplying the silica-based abrasive to the polishing pad simultaneously with the supply of the ceria-based abrasive; and mixing the ceria-based abrasive and the silica-based abrasive on the polishing pad to provide the slurry on the polishing pad.

The ceria-based abrasive may be supplied to a position closer to the center of the polishing pad than the silica-based abrasive, and may be mixed with the silica-based abrasive on the polishing pad. The ceria-based abrasive may be supplied to a position that is $85/390$-$105/390$ of the radius of the polishing pad distant from the center of the polishing pad. The silica-based abrasive may be supplied to a position that is approximately $10/390$ of the radius of the polishing pad more distant from the center of the polishing pad than the supply position of the ceria-based abrasive.

The slurry may further comprise an anionic additive or a nonionic additive.

The target film may be one selected from the group consisting of: a polysilicon film, a silicon oxide film, a tungsten film, a copper film, and an aluminum film.

The CMP method may further comprise, after first polishing the target film, supplying a slurry comprising a ceria-based abrasive having a concentration of 0.001-10 percent by weight and a silica-based abrasive having a concentration of 1-24 percent by weight to the polishing pad of the CMP apparatus; second polishing the target film on the semiconductor substrate on the polishing pad; supplying a slurry comprising a ceria-based abrasive having a concentration of 0.001-10 percent by weight to the polishing pad of the CMP apparatus; and third polishing the target film on the semiconductor substrate on the polishing pad.

In accordance with yet another aspect of the invention, a chemical mechanical polishing (CMP) apparatus comprises a polishing pad; a polishing head disposed above the polishing pad for fixing and rotating a semiconductor substrate having a target film formed thereon; a first supply unit for supplying a ceria-based abrasive to the polishing pad; and a second supply unit for supplying a silica-based abrasive to the polishing pad. The first and second supply units simultaneously supply the ceria-based abrasive and the silica-based abrasive to the polishing pad, when the target film is polished, so that the ceria-based abrasive and the silica-based abrasive are mixed on the polishing pad to provide a slurry comprising the ceria-based abrasive having a concentration of 0.001-10 percent by weight and the silica-based abrasive having a concentration of 1-24 percent by weight.

Preferably, the concentration of the ceria-based abrasive in the slurry is 0.05-5 percent by weight and the concentration of the silica-based abrasive in the slurry is 1-7 percent by weight.

The ceria-based abrasive may be supplied to a position closer to the center of the polishing pad than the silica-based abrasive.

Preferably, the ceria-based abrasive is supplied to a position that is $85/390$-$105/390$ of the radius of the polishing pad distant from the center of the polishing pad, and the silica-based abrasive is supplied to a position that is approximately $10/390$ of the radius of the polishing pad more distant from the center of the polishing pad than the supply position of the ceria-based abrasive.

DESCRIPTION OF SPECIFIC EMBODIMENTS

A chemical mechanical polishing slurry (hereinafter, referred to as a "CMP" slurry) in accordance with one embodiment of the invention comprises a ceria-based abrasive having a concentration of 0.001-10 percent by weight and a silica-based abrasive having a concentration of 1-24 percent by weight. Preferably, the concentration of the ceria-based abrasive is 0.05-5 percent by weight and the concentration of the silica-based abrasive is 1-7 percent by weight.

The CMP slurry comprises both a ceria-based abrasive and a silica-based abrasive. A chemical mechanical polishing process (hereinafter, referred to as a "CMP" process) comprises one polishing step using the above CMP slurry comprising both a ceria-based abrasive and a silica-based abrasive.

As results of experimentation, which will be described below, it was revealed that defects, such as scratches on a target film, are remarkably reduced by a CMP process using the above-described CMP slurry. Furthermore, it was revealed that a high polishing rate of the target film is maintained by the CMP process using the above-described CMP slurry.

An example CMP slurry (pH 7.0-8.0) comprises a ceria-based abrasive having a concentration of 0.05 percent by weight, a silica-based abrasive having a concentration of 6.0 percent by weight, and water (deionized water). A CMP process was performed using this CMP slurry on a target film to be polished under conditions in which a pressure between a semiconductor substrate (wafer) with the target film formed thereon and a polishing pad is 0.1 psi. The polishing pad has a rotational speed of 80 RPM, and the semiconductor substrate has a rotational speed of 79 RPM (Experiment 1). In comparison, a first CMP process was performed using a CMP slurry comprising a ceria-based abrasive having a concentration of 0.05 percent by weight and water (deionized water). A second CMP process was performed under the same conditions as Experiment 1 using a CMP slurry comprising a silica-based abrasive having a concentration of 6.0 percent by weight and water (deionized water) (Experiment 2).

After the CMP processes were performed on the target films (silicon oxide films) according to Experiments 1 and 2 for approximately 1 minute, the thicknesses of the polished target films were measured as shown in Table 1.

TABLE 1

| Wafer No. | Method for CMP process | Thickness (Å) of silicon oxide film before CMP process | Thickness (Å) of silicon oxide film after CMP process |
| --- | --- | --- | --- |
| Wafer 1 | Experiment 2 | 7,527 | 3,339 |
| Wafer 2 | Experiment 1 | 7,410 | 3,026 |
| Wafer 3 | Experiment 1 | 7,477 | 3,459 |
| Wafer 4 | Experiment 1 | 7,419 | 3,430 |

Figure 1A:
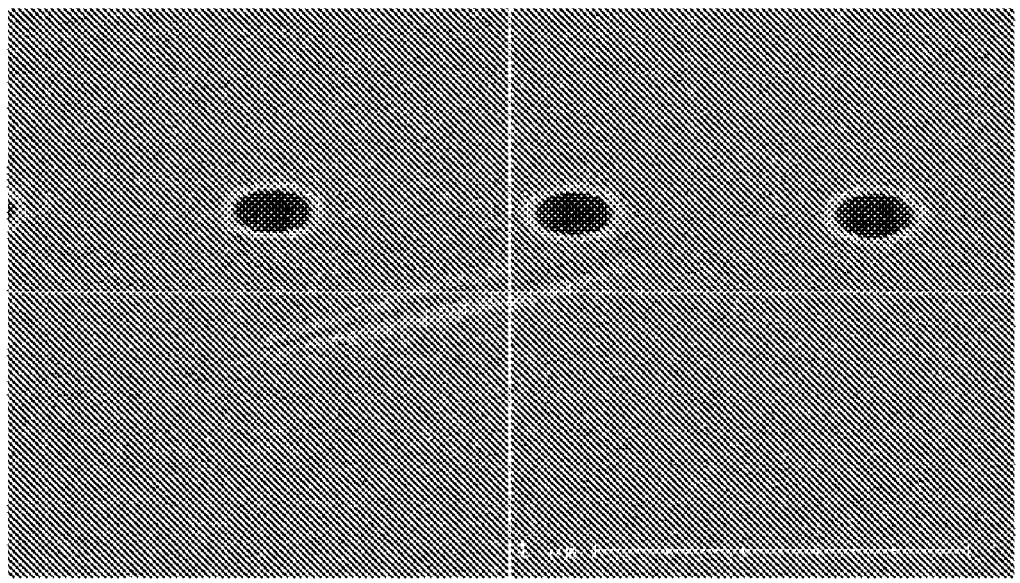
FIGS. 1A and 1B are SEM photographs illustrating scratches on a target film, after a conventional chemical mechanical polishing process is carried out.
Figure 1B:
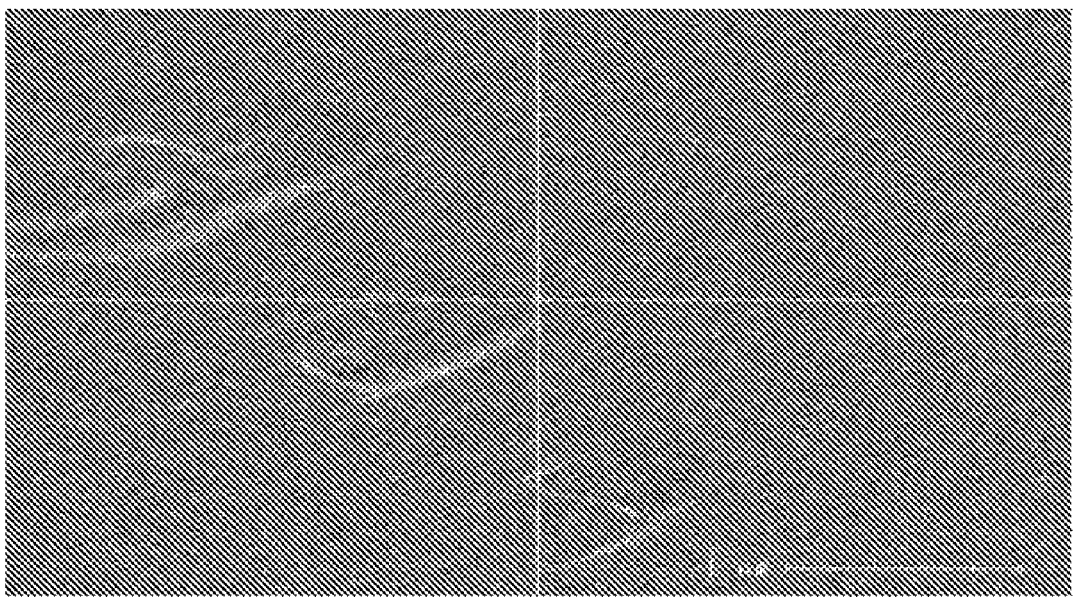
Figure 2A:
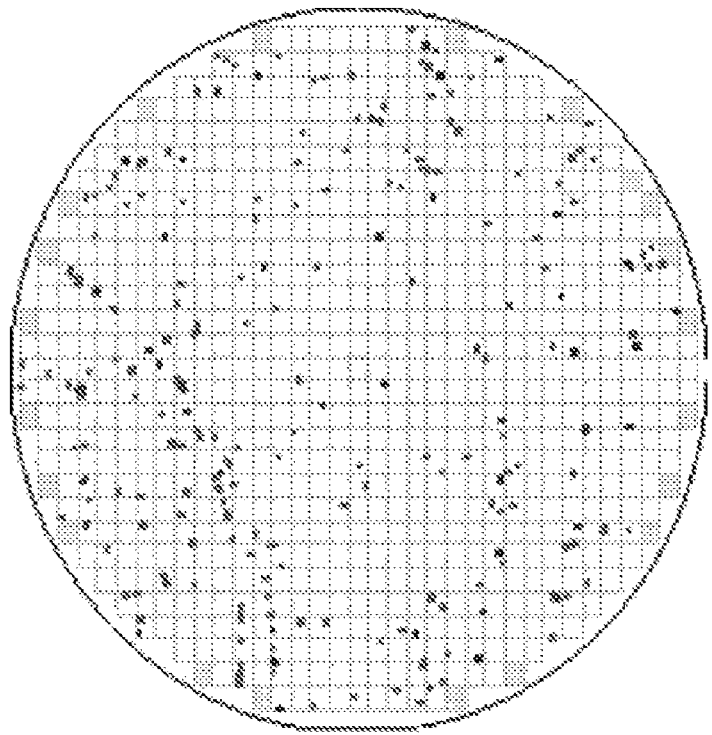
FIG. 2A is a wafer map illustrating an aspect of defects, such as scratches on a wafer, after a chemical mechanical polishing process using a slurry including a silica-based abrasive is carried out.
Figure 2B:
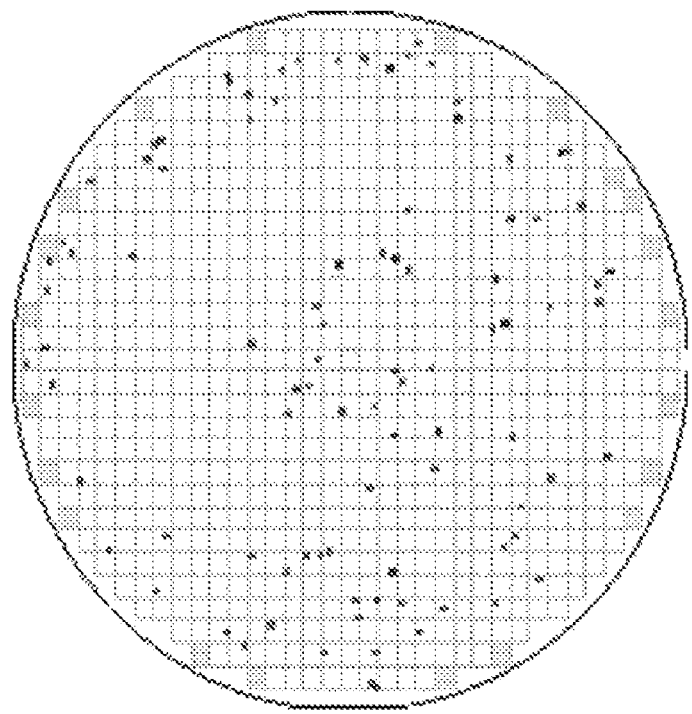
FIGS. 2B to 2D are wafer maps respectively illustrating aspects of defects, such as scratches on wafers, after a chemical mechanical polishing process using a slurry including a silica-based abrasive and a ceria-based abrasive is carried out.
Figure 2C:
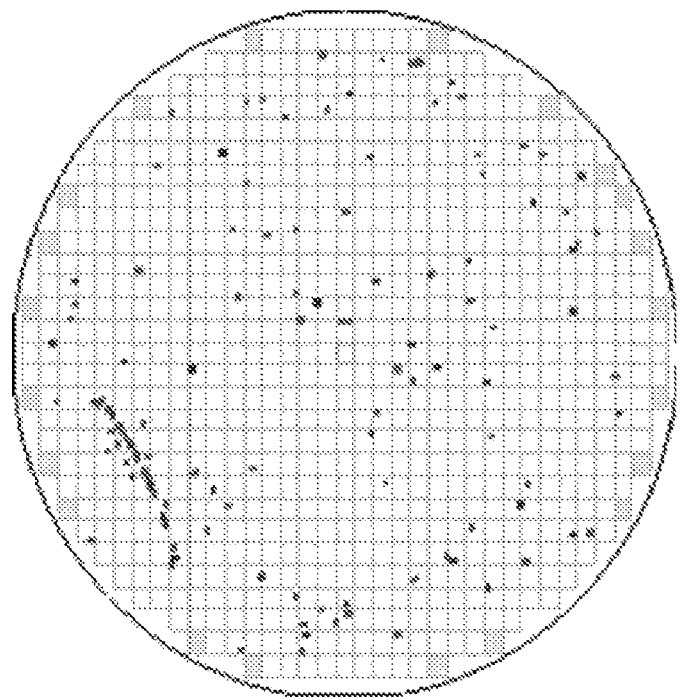
Figure 2D:
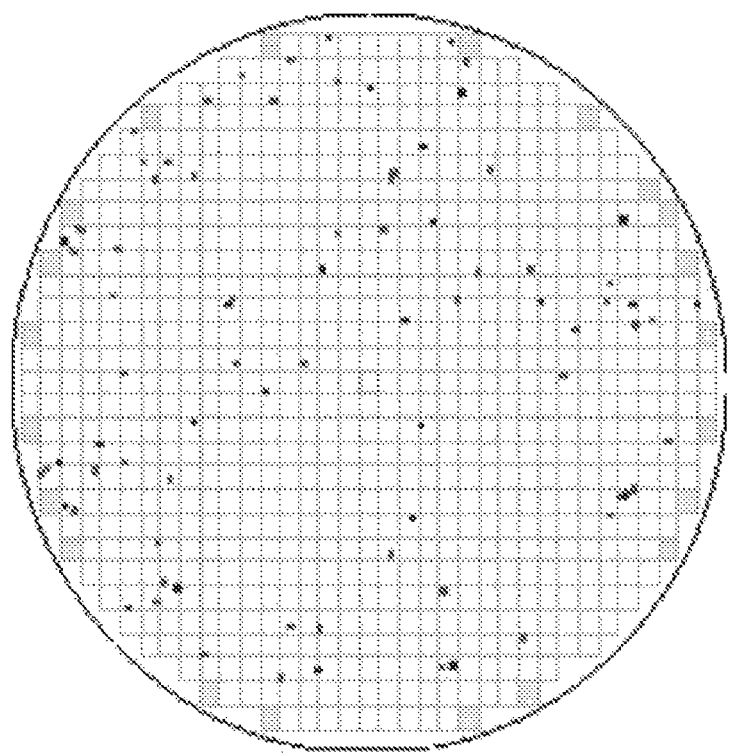

FIG. 2A is a wafer map illustrating an aspect of defects, such as scratches, on wafer 1, and FIGS. 2B to 2D are wafer maps illustrating aspects of defects, such as scratches, on wafers 2 to 4.

With reference to Table 1, when the CMP process using the CMP slurry comprising both a ceria-based abrasive and a silica-based abrasive is performed (Experiment 1), the target film (silicon oxide film) was polished at an excellent polishing rate. The polishing rate is equivalent to the first and second CMP processes, which are separately carried out using two CMP slurries comprising either a ceria-based abrasive or a silica-based abrasive, respectively (Experiment 2).

Furthermore, with reference to FIGS. 2A to 2D, when the CMP process using the CMP slurry comprising both a ceria-based abrasive and a silica-based abrasive (as shown in FIGS. 2B to 2D) is performed (Experiment 1), the frequency of defects, such as scratches, on the target film, was reduced compared with the first and second CMP processes, which are separately carried out using two CMP slurries comprising either a ceria-based abrasive or a silica-based abrasive, respectively (as shown in FIG. 2A; Experiment 2).

In the CMP slurry of the present invention, particles of the ceria-based abrasive are dispersed into particles of the silica-based abrasive. The CMP slurry of the present invention also prevents the particles of the silica-based abrasive from cohering, thereby preventing the CMP slurry from solidifying on the polishing pad. In other words, the solidification of the CMP slurry on the polishing pad is prevented, thereby reducing defects, such as scratches, on the target film, decreasing the amount of the CMP slurry used, and extending the life span of the polishing pad.

The CMP slurry, which comprises both the ceria-based abrasive and the silica-based abrasive, can exploit the advantages of the two abrasives. Accordingly, due to the silica-based abrasive, the CMP slurry exhibits an excellent polishing rate of the target film, particularly, in an initial step in which there are stepped portions on the target film, and effectively removes the stepped portions on the target film. Furthermore, due to the ceria-based abrasive having a high polishing selectivity (for example, the polishing selectivity of a silicon oxide film to a silicon nitride film is approximately 8:1-10:1) compared with the silica-based abrasive (having polishing selectivity of a silicon oxide film to a silicon nitride film being approximately 3:1), the CMP slurry easily controls the polishing degree of the target film (e.g. using a hard mask including a silicon nitride film) thereby improving the yield of the CMP process.

Accordingly, by using the above-described CMP slurry, the high polishing rate of the target film, particularly, in an initial step of the CMP process, is maintained. The stepped portions on the target film are effectively removed. Defects, such as scratches, on the target film are reduced. The yield and the productivity of the CMP process are also improved.

The CMP slurry with mixed ceria-based abrasive and silica-based abrasive may be supplied to a polishing pad of a chemical mechanical polishing apparatus (hereinafter, referred to as a "CMP" apparatus). Alternatively, the ceria-based abrasive and the silica-based abrasive may be separately supplied to the polishing pad of the CMP apparatus and mixed on the polishing pad to provide the CMP slurry on the polishing pad.

When the CMP slurry having mixed ceria-based abrasive and silica-based abrasive is supplied to the polishing pad, particles of the ceria-based abrasive and particles of the silica-based abrasive may cohere during storage of the CMP slurry before the CMP slurry is supplied to the polishing pad. The CMP slurry may solidify on the polishing pad, and generate defects, such as scratches, on the target film. Therefore, it is preferable that the ceria-based abrasive and the silica-based abrasive are separately supplied to the polishing pad and mixed by the rotary force of the polishing pad to provide the CMP slurry on the polishing pad.

As described above, when the ceria-based abrasive and the silica-based abrasive are separately supplied to the polishing pad, the two abrasives are simultaneously supplied to the polishing pad so as to be uniformly mixed on the polishing pad to provide the CMP slurry on the polishing pad. Here, the term "simultaneously" means that the two abrasives are supplied to the polishing pad, for example, at a time difference of several seconds to several tens of seconds as long as the two abrasives can be uniformly mixed on the polishing pad. "simultaneously" also means that the two abrasives are supplied to the polishing pad at substantially the same time.

When the ceria-based abrasive and the silica-based abrasive are separately supplied to the polishing pad and mixed on the polishing pad to provide the CMP slurry, the ceria-based abrasive is supplied to a position closer to the center of the polishing pad than the silica-based abrasive. Preferably, the ceria-based abrasive is supplied to a position that is $85/390$-$105/390$ of the radius of the polishing pad distant from the center of the polishing pad, and the silica-based abrasive is supplied to a position that is approximately $10/390$ of the radius of the polishing pad more distant from the center of the polishing pad than the supply position of the ceria-based abrasive, so that the ceria-based abrasive and the silica-based abrasive can be mixed on the polishing pad.

The ceria-based abrasive has a comparatively small weight and low viscosity due to a comparatively small molecular weight of ceria ($CeO_2$), and is easily partially discharged to the outside of the polishing pad by the rotation of the polishing pad. On the other hand, the silica-based abrasive has a comparatively large weight and high viscosity due to a comparatively large molecular weight of silica ($SiO_2$), and is scarcely discharged to the outside of the polishing pad. Therefore, the ceria-based abrasive is supplied to a position closer to the center of the polishing pad, and the silica-based abrasive is supplied to a position more distant from the center of the polishing pad than the supply position of the ceria-based abrasive (i.e., a position closer to the edge of the polishing pad). Thus, it is possible to reduce a loss of the ceria-based abrasive and to uniformly mix the ceria-based abrasive and the silica-based abrasive by the rotation of the polishing pad to provide the CMP slurry on the polishing pad.

The CMP slurry may further comprise an anionic additive or a nonionic additive. The anionic additive may be carboxylic acid or its salts, sulfate ester or its salts, sulfonic acid or its salts, or phosphate ester or its salts. The nonionic additive may be a polyethylene glycol type surfactant or polyhydroxy alcohol type surfactant. The anionic additive or the nonionic additive, for example, has a concentration of approximately 0.005-1 percent by weight.

The above CMP slurry may be applied to a CMP process for polishing any thin film, for example, a polysilicon film, a silicon oxide film, a tungsten film, a copper film, or an aluminum film, which is formed on a semiconductor substrate during the fabrication of a semiconductor device. Furthermore, the CMP slurry may be applied to any process requiring the polishing of a target film, for example, a shallow trench isolation (STI) process, a landing plug formation process, a metal wiring formation process, or an interlayer dielectric formation process during the fabrication of a semiconductor device.

A chemical mechanical polishing method (hereinafter, referred to as a "CMP" method) in accordance with one embodiment of the invention comprises: supplying a CMP slurry comprising a ceria-based abrasive having a concentration of 0.001-10 percent by weight and a silica-based abrasive having a concentration of 1-24 percent by weight to a polishing pad of a CMP apparatus, and first polishing a target film on a semiconductor substrate on the polishing pad. Preferably, in the CMP method, the concentration of the ceria-based abrasive in the CMP slurry is 0.05-5 percent by weight and the concentration of the silica-based abrasive in the CMP slurry is 1-7 percent by weight.

In the CMP method, a CMP process is performed on a target film of a semiconductor substrate using the above-described CMP slurry in accordance with one embodiment. According to this CMP method, the high polishing rate of the target film, in an initial step of the CMP process, is maintained, stepped portions on the target film are effectively removed, defects (such as scratches) on the target film are reduced, and the yield and the productivity of the CMP process are improved.

In the CMP method, the step of supplying the CMP slurry includes supplying the ceria-based abrasive to the polishing pad, supplying the silica-based abrasive to the polishing pad simultaneously with the supply of the ceria-based abrasive, and mixing the ceria-based abrasive and the silica-based abrasive on the polishing pad to provide the CMP slurry on the polishing pad.

In the CMP method, the ceria-based abrasive and the silica-based abrasive are simultaneously but separately supplied to the polishing pad, and are uniformly mixed on the polishing pad to provide the CMP slurry on the polishing pad. Then, the CMP process is performed using the CMP slurry.

As described above, the CMP slurry having the ceria-based abrasive and the silica-based abrasive pre-mixed is not supplied to the polishing pad. Rather, the ceria-based abrasive and the silica-based abrasive are separately supplied to the polishing pad and mixed on the polishing pad to provide the CMP slurry, thereby reducing the solidification of the CMP slurry on the polishing pad due to the coherence of particles of the abrasives. Thus, it is possible to reduce defects, such as scratches, on a target film to be polished.

When the ceria-based abrasive and the silica-based abrasive are separately supplied to the polishing pad and mixed on the polishing pad, the ceria-based abrasive is supplied at a position closer to the center of the polishing pad than the silica-based abrasive. Preferably, the ceria-based abrasive is supplied at a position that is $^{85}/_{390}$-$^{105}/_{390}$ of the radius of the polishing pad distant from the center of the polishing pad, and the silica-based abrasive is supplied to a position that is approximately $^{10}/_{390}$ of the radius of the polishing pad more distant from the center of the polishing pad than the supply position of the ceria-based abrasive, so that the ceria-based abrasive and the silica-based abrasive can be mixed on the polishing pad.

As described above, the ceria-based abrasive having a comparatively small weight and low viscosity is supplied to a position close to the center of the polishing pad. The silica-based abrasive is supplied to a position more distant from the center of the polishing pad than the supply position of the ceria-based abrasive. The two abrasives are uniformly mixed by the rotation of the polishing pad while reducing a loss of the ceria-based abrasive to provide the CMP slurry on the polishing pad.

In the CMP method, the CMP slurry may further comprise an anionic additive or a nonionic additive.

Although the above CMP method comprises a single step of polishing a target film on a semiconductor substrate on the polishing pad, the CMP method may comprise at least two steps of polishing the target film at least twice. For example, the CMP method further comprise, after the step of first polishing the target film using the CMP slurry comprising the ceria-based abrasive and the silica-based abrasive, second and third polishing the target film using a CMP slurry comprising a ceria-based abrasive, or second and third polishing the target film using a CMP slurry comprising a ceria-based abrasive and a silica-based abrasive.

After the target film is first polished using the CMP slurry comprising the ceria-based abrasive and the silica-based abrasive, the target film is second polished using a CMP slurry comprising a ceria-based abrasive and a silica-based abrasive, and is third polished using a CMP slurry comprising a ceria-based abrasive. Accordingly, the CMP method may further comprise, after the first polishing of the target film, supplying a CMP slurry comprising a ceria-based abrasive having a concentration of 0.001-10 percent by weight and a silica-based abrasive having a concentration of 1-24 percent by weight to the polishing pad of the CMP apparatus, second polishing the target film of the semiconductor substrate on the polishing pad using the CMP slurry, supplying a CMP slurry comprising a ceria-based abrasive having a concentration of 0.001-10 percent by weight to the polishing pad of the CMP apparatus, and third polishing the target film on the semiconductor substrate on the polishing pad using the CMP slurry.

In the CMP method, the target film may be any thin film formed on a semiconductor substrate during the fabrication of a semiconductor device. For example, the target film may include a polysilicon film, a silicon oxide film, a tungsten film, a copper film or an aluminum film. Furthermore, the CMP method may be applied to any process requiring the polishing of a target film during the fabrication of a semiconductor device. For example, the CMP method may be applied to a shallow trench isolation (STI) process, a landing plug formation process, a metal wiring formation process, or an interlayer dielectric formation process.

Figure 3:
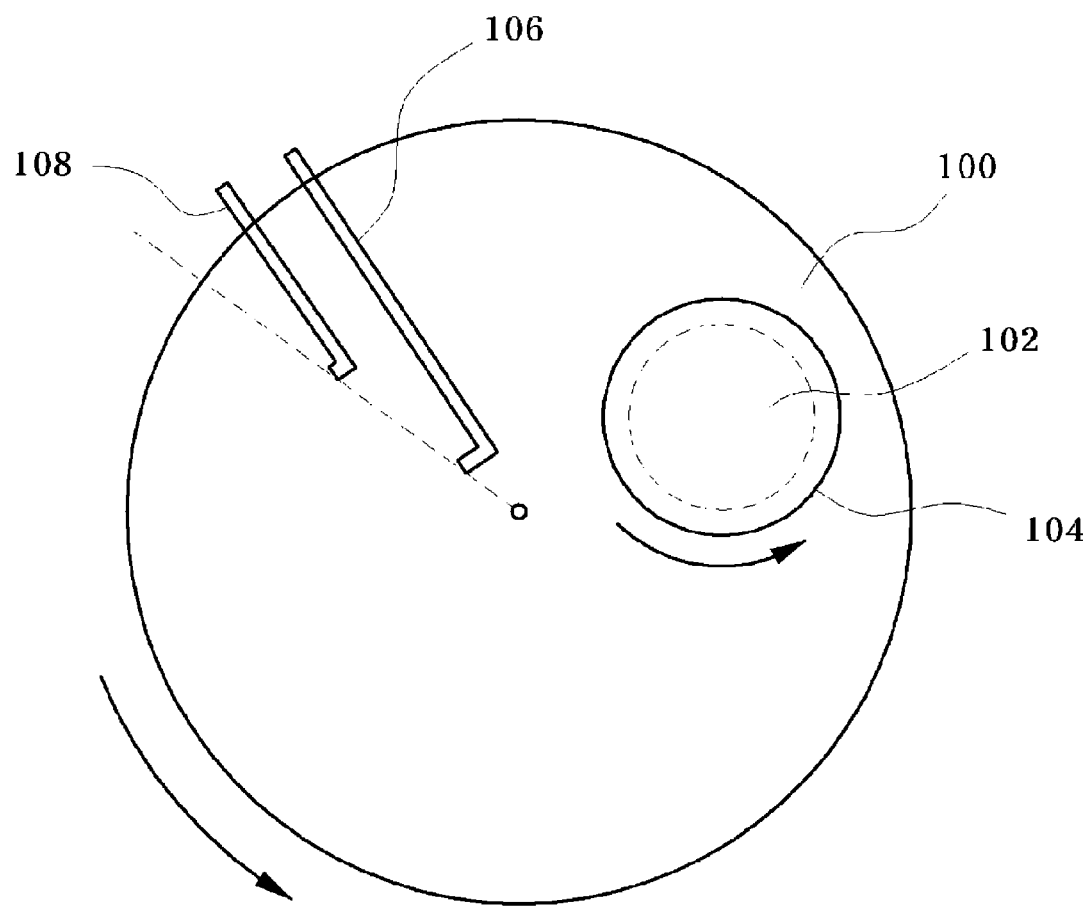
FIG. 3 is a schematic view illustrating a chemical mechanical polishing apparatus in accordance with one embodiment of the present invention.

FIG. 3 is a schematic view illustrating a CMP apparatus in accordance with one embodiment of the invention.

The CMP apparatus comprises a polishing pad 100, and a polishing head 104 disposed above the polishing pad 100 for fixing and rotating a semiconductor substrate 102 having a target film formed thereon. As the polishing pad 100 is rotated, the semiconductor substrate 102 on the polishing pad 100 is rotated at a designated speed by the polishing head 104. Thus, a CMP process is performed. In the CMP process, when the target film on the semiconductor substrate 102 and the polishing pad 100, which are respectively rotated, contact each other, the target film is polished by a chemical reaction between a CMP slurry and the target film on the polishing pad 100, and mechanical friction between abrasives contained in the CMP slurry and the target film.

The CMP apparatus further comprises first and second supply units 106 and 108, which respectively supply a ceria-based abrasive and a silica-based abrasive to the polishing pad. The first and second supply units 106 and 108 separately supply the ceria-based abrasive and the silica-based abrasive simultaneously to the polishing pad 100 so that the ceria-based abrasive and the silica-based abrasive are mixed on the polishing pad 100. Thus, a CMP slurry in accordance with one embodiment of the invention (i.e., a CMP slurry comprising the ceria-based abrasive having a concentration of 0.001-10 percent by weight and the silica-based abrasive having a concentration of 1-24 percent by weight) is provided and is used to perform the CMP process.

Accordingly, when the CMP slurry is supplied and the CMP process is performed on a target film using the above CMP apparatus, a high polishing rate of the target film, particularly, in an initial step of the CMP process, is maintained. Stepped portions on the target film are effectively removed. Defects, such as scratches, on the target film are reduced. The yield and the productivity of the CMP process are also improved.

Preferably, in the above-described CMP apparatus, the concentration of the ceria-based abrasive in the CMP slurry is 0.05-5 percent by weight and the concentration of the silica-based abrasive in the CMP slurry is 1-7 percent by weight.

In the CMP apparatus, the ceria-based abrasive is supplied to a position closer to the center of the polishing pad 100 than the silica-based abrasive by the first and second supply units 106 and 108. Preferably, the ceria-based abrasive is supplied to a position that is $^{85}/_{390}$-$^{105}/_{390}$ of the radius of the polishing pad 100 distant from the center of the polishing pad 100, by the first supply unit 106, and the silica-based abrasive is supplied to a position that is approximately $^{10}/_{390}$ of the radius of the polishing pad 100 more distant from the center of the polishing pad 100 than the supply position of the ceria-based abrasive, by the second supply unit 108.

As described above, the ceria-based abrasive having a comparatively small weight and low viscosity is supplied to a position close to the center of the polishing pad 100, the silica-based abrasive is supplied to a position more distant from the center of the polishing pad 100 than the supply position of the ceria-based abrasive. The two abrasives are uniformly mixed by the rotation of the polishing pad 100 while reducing a loss of the ceria-based abrasive when providing the CMP slurry on the polishing pad 100.

What is claimed is:

1. A chemical mechanical polishing (CMP) method comprising:
    supplying a slurry comprising a ceria-based abrasive having a concentration of 0.001-10 percent by weight and a silica-based abrasive having a concentration of 1-24 percent by weight to a polishing pad of a CMP apparatus; and
    first polishing a target film on a semiconductor substrate on the polishing pad,
    wherein supplying the slurry comprises
        supplying the ceria-based abrasive to the polishing pad,
        supplying the silica-based abrasive to the polishing pad substantially simultaneously with the supply of the ceria-based abrasive, and
        mixing the ceria-based abrasive and the silica-based abrasive on the polishing pad to provide the slurry on the polishing pad, and
    wherein the ceria-based abrasive is supplied to a position closer to the center of the polishing pad than the silica-based abrasive, and is mixed with the silica-based abrasive on the polishing pad.

2. The CMP method according to claim 1, wherein the concentration of the ceria-based abrasive in the slurry is 0.05-5 percent by weight and the concentration of the silica-based abrasive in the slurry is 1-7 percent by weight.

3. The CMP method according to claim 1, wherein the ceria-based abrasive is supplied to a position that is $85/390$-$105/390$ of the radius of the polishing pad distant from the center of the polishing pad, and the silica-based abrasive is supplied to a position that is approximately $10/390$ of the radius of the polishing pad more distant from the center of the polishing pad than the supply position of the ceria-based abrasive.

4. The CMP method according to claim 1, wherein the slurry further comprises an anionic additive or a nonionic additive.

5. The CMP method according to claim 1, wherein the target film is one selected from the group consisting of: a polysilicon film, a silicon oxide film, a tungsten film, a copper film, and an aluminum film.

6. A chemical mechanical polishing (CMP) method comprising:
    supplying a slurry comprising a ceria-based abrasive having a concentration of 0.001-10 percent by weight and a silica-based abrasive having a concentration of 1-24 percent by weight to a polishing pad of a CMP apparatus;
    first polishing a target film on a semiconductor substrate on the polishing pad;
    supplying a slurry comprising a ceria-based abrasive having a concentration of 0.001-10 percent by weight and a silica-based abrasive having a concentration of 1-24 percent by weight to the polishing pad of the CMP apparatus;
    second polishing the target film on the semiconductor substrate on the polishing pad;
    supplying a slurry comprising a ceria-based abrasive having a concentration of 0.001-10 percent by weight to the polishing pad of the CMP apparatus; and
    third polishing the target film on the semiconductor substrate on the polishing pad.

* * * * *